(12) United States Patent
Richardson

(10) Patent No.: US 10,240,829 B2
(45) Date of Patent: Mar. 26, 2019

(54) ELECTRO-MAGNETIC CHECK VALVE

(71) Applicant: Carrier Corporation, Framington, CT (US)

(72) Inventor: Curtis Richardson, Newark, NY (US)

(73) Assignee: CARRIER CORPORATION, Farmington, CT (US)

(*) Notice: Subject to any disclaimer, the term of this patent is extended or adjusted under 35 U.S.C. 154(b) by 334 days.

(21) Appl. No.: 14/410,420

(22) PCT Filed: Apr. 25, 2013

(86) PCT No.: PCT/US2013/038104
§ 371 (c)(1),
(2) Date: Dec. 22, 2014

(87) PCT Pub. No.: WO2014/003882
PCT Pub. Date: Jan. 3, 2014

(65) Prior Publication Data
US 2015/0338144 A1 Nov. 26, 2015

Related U.S. Application Data

(60) Provisional application No. 61/663,868, filed on Jun. 25, 2012.

(51) Int. Cl.
*F25B 41/04* (2006.01)
*F16K 31/08* (2006.01)
(Continued)

(52) U.S. Cl.
CPC .......... *F25B 41/04* (2013.01); *B60H 1/00835* (2013.01); *F16K 31/0644* (2013.01);
(Continued)

(58) Field of Classification Search
CPC .... F16K 31/0644; F16K 31/08; F16K 31/082; F25D 17/04; B60H 1/00835
(Continued)

(56) References Cited

U.S. PATENT DOCUMENTS 3,750,693 A * 8/1973 Hardison ............... F16K 1/12
137/219
3,921,670 A 11/1975 Clippard, Jr. et al.
(Continued)

FOREIGN PATENT DOCUMENTS

CN 86107678 A 7/1987
CN 2246217 Y 1/1997
(Continued)

OTHER PUBLICATIONS

Singapore Written Opinion and Search, dated Nov. 13, 2015, 7 pages.
(Continued)

*Primary Examiner* — Frantz Jules
*Assistant Examiner* — Daniel C Comings
(74) *Attorney, Agent, or Firm* — Cantor Colburn LLP

(57) ABSTRACT

A valve for use in an air exchange panel (20) of a transportation refrigeration system is provided including a valve cap (102) configured and arranged to be positioned adjacent the air exchange panel (20) and movable between a first position and a second position. The valve cap (102) includes a magnetic portion. A resilient flexible member (110) is coupled to the valve cap (102) and is configured and arranged to be coupled to the air exchange panel (20). The resilient flexible member (110) biases the valve cap (102) into a first position. An electromagnet (150) is positioned inside the air exchange panel (20), opposite the valve cap (102). A controller is coupled to the electromagnet (150) to selectively apply power to move the valve cap (102) between the first position and the second position.

15 Claims, 6 Drawing Sheets

(51) Int. Cl.
  *B60H 1/00* (2006.01)
  *F16K 31/06* (2006.01)
  *F25D 17/04* (2006.01)
(52) U.S. Cl.
  CPC ............ *F16K 31/08* (2013.01); *F16K 31/082* (2013.01); *F25D 17/042* (2013.01); *F25D 17/045* (2013.01)
(58) Field of Classification Search
  USPC .................................................... 62/186, 404
  See application file for complete search history.

(56) References Cited

U.S. PATENT DOCUMENTS

| | | | |
|---|---|---|---|
| 4,089,348 A | | 5/1978 | Yoshida et al. |
| 4,196,751 A | * | 4/1980 | Fischer ............... F16K 31/0606 137/625.65 |
| 4,240,580 A | * | 12/1980 | Fehr ................... B60H 1/00835 137/72 |
| 4,716,739 A | | 1/1988 | Harris et al. |
| 5,156,009 A | | 10/1992 | Woodruff |
| 5,172,566 A | | 12/1992 | Jung et al. |
| 5,211,372 A | * | 5/1993 | Smith, Jr. ............... F01L 25/08 251/129.19 |
| 5,215,498 A | | 6/1993 | Wong et al. |
| 5,245,956 A | | 9/1993 | Davidson |
| 5,370,152 A | | 12/1994 | Carey et al. |
| 5,460,010 A | * | 10/1995 | Kobayashi ............ F25D 17/045 62/153 |
| 5,872,721 A | | 2/1999 | Huston et al. |
| 5,965,185 A | | 10/1999 | Bianco |
| 6,077,160 A | | 6/2000 | Franaszek et al. |
| 6,595,847 B1 | | 7/2003 | Freese et al. |
| 7,089,751 B2 | | 8/2006 | Fleming et al. |
| 7,171,821 B2 | | 2/2007 | Yoong et al. |
| 7,467,522 B2 | | 12/2008 | Tanaka |
| 7,527,069 B2 | | 5/2009 | Denike et al. |
| 2004/0021107 A1 | | 2/2004 | Kimura et al. |
| 2005/0039468 A1 | * | 2/2005 | Arndt ................. B60H 1/00978 62/126 |
| 2013/0276906 A1 | * | 10/2013 | Locke .................. F04B 43/043 137/15.01 |

FOREIGN PATENT DOCUMENTS

| | | |
|---|---|---|
| CN | 1997292 A | 7/2007 |
| DE | 3621332 A1 | 1/1988 |
| EP | 0688508 B1 | 12/1995 |
| WO | 0023350 A1 | 4/2000 |

OTHER PUBLICATIONS

Chinese Office Action and Search for application CN 201380031373.9, dated Jan. 4, 2016, 7 pages.
International Search Report for application PCT/US2013/038104, dated Aug. 2, 2013, 5 pages.
Written Opinion for application PCT/US2013/038104 dated Aug. 2, 2013, 7 pages.

* cited by examiner

ELECTRO-MAGNETIC CHECK VALVE

CROSS REFERENCE TO RELATED APPLICATIONS

This application claims the benefit of U.S. Provisional Patent Application Ser. No. 61/663,868 filed Jun. 25, 2012, the contents of which are incorporated herein by reference thereto

BACKGROUND OF THE INVENTION

The invention relates generally to transport refrigeration systems and, more particularly, to an air exchange valve of a transport refrigeration system.

A transport refrigeration system is used to control an environment in an enclosed area, such as the insulated box on trailers, trucks, containers. The refrigeration system absorbs heat from the enclosed area and releases the heat outside of the box into the environment. Perishable items that are commonly transported in such refrigeration systems respirate over time, converting oxygen into carbon dioxide. If the concentration of oxygen is too low, or the concentration of carbon dioxide is too high, the cargo may be damaged. Fresh air exchanges avoid such a result by drawing fresh air into the system and forcing the carbon dioxide out an exhaust. The amount of fresh air drawn into the refrigeration system must be limited because the air may dry out the perishable items, and because power from the system must be used to cool the air.

BRIEF DESCRIPTION OF THE INVENTION

According to one embodiment of the invention, a valve for use in an air exchange panel of a transportation refrigeration system is provided including a valve cap configured and arranged to be positioned adjacent the air exchange panel and movable between a first position and a second position. The valve cap includes a magnetic portion. A resilient flexible member is coupled to the valve cap and is configured and arranged to be coupled to the air exchange panel. The resilient flexible member biases the valve cap into a first position. An electromagnet is positioned inside the air exchange panel, opposite the valve cap. A controller is coupled to the electromagnet to selectively apply power to move the valve cap between the first position and the second position.

According to another embodiment of the invention, a transportation refrigeration system is provided including a container having a wall. A sensor detects a state inside the container. An air exchange panel is located with the wall of the container and includes an air intake duct. An air exchange valve is mounted to the air exchange panel adjacent the air intake duct and includes a valve cap movable between a first position and a second position. A resilient flexible member is coupled to the valve cap and biases the valve cap to a first position. The air exchange valve also includes an electromagnet located with the air exchange panel, opposite the valve cap. A controller is coupled to the electromagnet to selectively apply power to the electromagnet to move the valve cap between the first position and the second position in response to a signal from the sensor.

According to yet another embodiment of the invention, a method for operating a transportation refrigeration system having a container configured to store cargo is provided including detecting an oxygen level within the container. Power is applied to an electromagnet if the oxygen level is greater than or equal to a threshold. The oxygen level within the container is again detected. Power is removed from the electromagnet if the oxygen level is below the threshold. The valve cap is biased into a first position by a resilient flexible member.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
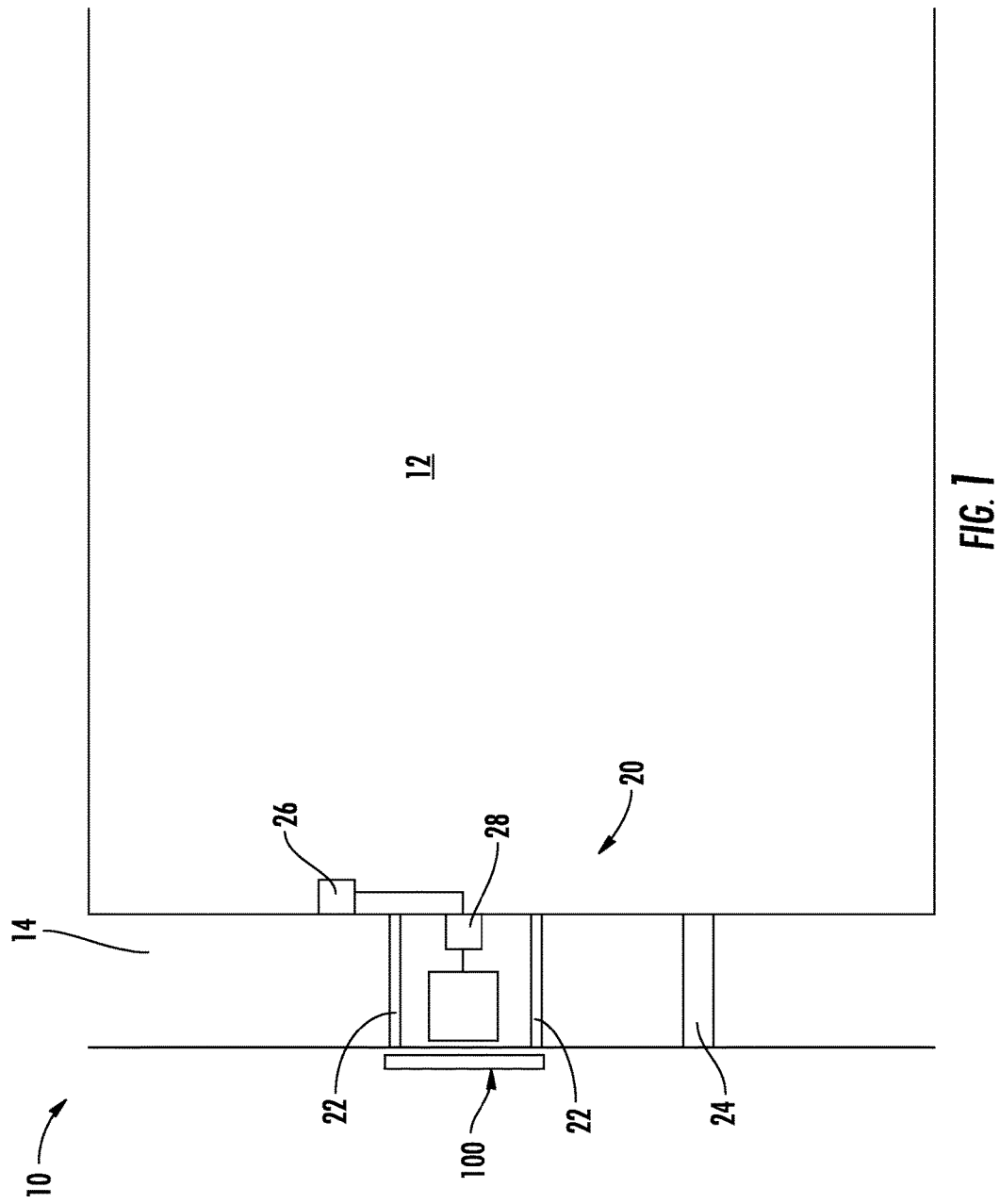
FIG. 1 is a cross-section of a portion of a transportation refrigeration system.

Referring to FIG. 1, a simplified schematic diagram of a portion of an exemplary transport refrigeration system 10 is illustrated. The system 10 includes a container 12 for storing cargo, such as perishable goods for example. At least one wall 14 of the container 12 includes an air exchange panel 20. The air exchange panel 20 includes at least one air intake duct 22, at least one air exhaust duct 24, an air exchange valve 100 and a sensor 26. The air intake duct 24 receives oxygen-rich air external to the system, such as from the atmosphere for example. The carbon dioxide-rich air within the container 12 flows through the air exhaust duct 24 and is discharged outside the container 12. In one embodiment, the sensor 26 is configured to detect the amount of oxygen in the container 12 and based on the oxygen level detected to selectively operate the air exchange valve 100. More specifically, if the sensed oxygen level is below a predetermined value, a controller 28 in communication with the sensor 26 will open the air exchange valve 100, so that oxygen-rich air will flow through the air intake duct 22 and into the container 12. It will be appreciated that alternatively, the sensor 26 may be configured to sense the amount of carbon-dioxide in the container 12.

The air exchange valve 100 is mounted to the air exchange panel 20 adjacent the air intake duct 22 and is movable between a closed position, in which the air flow through the air intake duct 22 is inhibited, and an open position, in which the airflow through the air intake duct 22 is allowed. The air exchange valve 100 is electrically coupled through a controller 28 to the sensor 26. During normal operation of the system, when the sensor 26 determines that the oxygen in the container 12 is at an acceptable level, the valve 100 is held in the closed position, and flow through the air intake duct 22 is prohibited or substantially inhibited. If, however, the sensor 26 determines that the oxygen level is low, the valve 100 is opened, allowing oxygen-rich air to flow through the air intake duct 22 and into the container 12.

Figure 2:
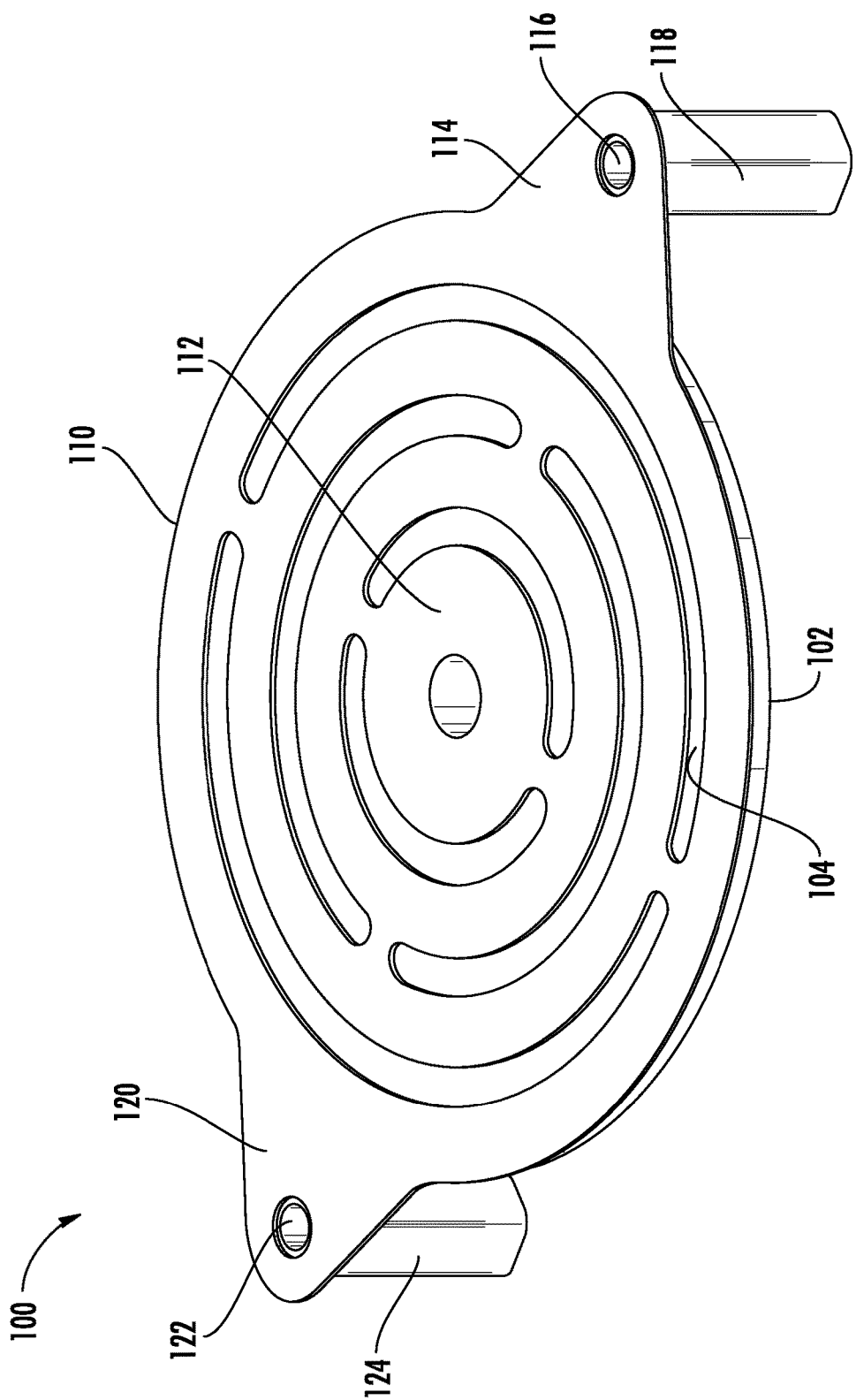
FIG. 2 is a perspective view of an open air exchange valve.
Figure 3:
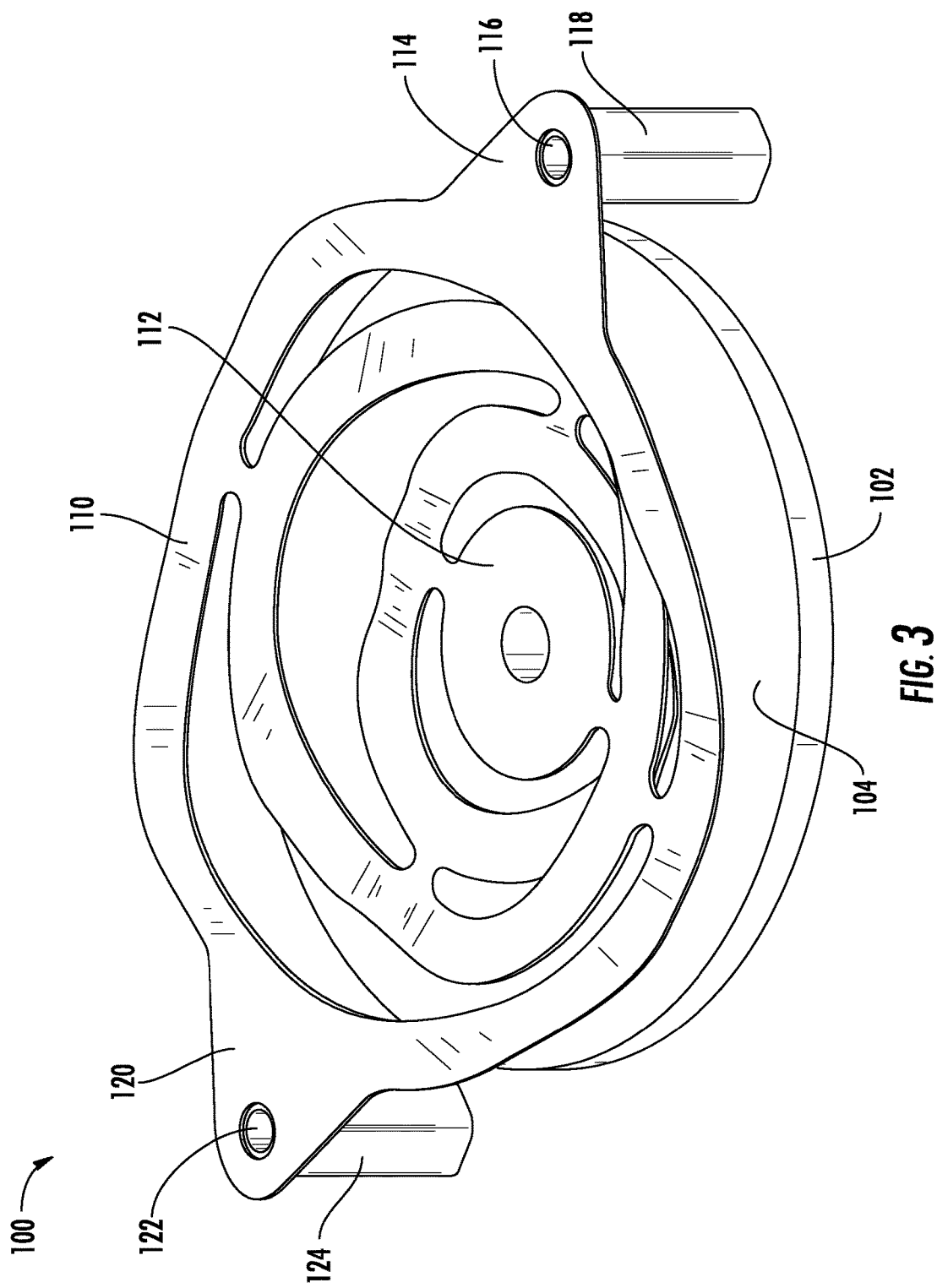
FIG. 3 is a perspective view of a closed air exchange valve.

Referring now to FIGS. 2 and 3, an air exchange valve 100 is illustrated. The air exchange valve 100 includes a valve cap 102 mounted to a resilient flexible member 110, the valve cap 102 being movable between an open position and a closed position. The valve cap 102 may be made from a magnetic material or from an iron based steel. The valve cap 102 is sized such that when the valve cap 102 is in a closed position, the valve cap 102 inhibits air flow through the air intake ducts 22 of the air exchange panel 20. In one embodiment, a portion 112 of the resilient flexible member 110 is coupled to a first surface 104 of the valve cap 102, such as at the center of the first surface 104 for example. Alternate connections between the resilient flexible member 110 and the cap 102 are within the scope of the invention. In one embodiment, the resilient flexible member 110 is made from a sheet metal having a grain structure such that the resilient flexible member 110 has an increased flexibility in a direction parallel to the grain and an increased stiffness in a direction normal to the grain. The resilient flexible member 110 biases the valve cap 102 into an open position. In one embodiment, when the valve cap 102 is in an open position (see FIG. 2), the resilient flexible member 110 is located within a plane and the first surface 104 of the valve cap 102 coupled to the resilient flexible member 110 is parallel to and abuts that plane. When the valve cap 102 is in a closed position, shown in FIG. 3, the portion 112 of the resilient flexible member 110 coupled to the valve cap 102 extends out of the plane in the direction of the air exchange panel 20.

The valve cap 102 may additionally include at least one sealing mechanism 108 (FIG. 5) for engagement with a portion of an air exchange panel 20. The sealing mechanism 108 may be connected to or may be integrally formed with a second surface 106 (FIG. 5), opposite the first surface 104, of the valve cap 102. In one embodiment, the sealing mechanism 108 is a generally v-shaped peak that extends from the second surface 106 of the valve cap 102 to engage a gasket on the air exchange panel 20 to seal a respective air intake duct 22. The resilient flexible member 110 includes a first flange 114 having a first hole 116 and a second flange 120 having a second hole 122. The first flange 114 and the second flange 120 are coplanar and located on opposing sides of the resilient flexible member 110. A first spacer 118 is mounted to the first flange 114 adjacent the first hole 116 and a second spacer 124 is mounted to the second flange 120 adjacent the second hole 122. The first and second spacers 118, 124 extend perpendicular to the plane of the resilient flexible member 110 in the direction of the air exchange panel 20. The spacers 118, 124 may be used to couple a portion of the resilient flexible member 110 to the air exchange panel 20 at a fixed distance.

Figure 4:
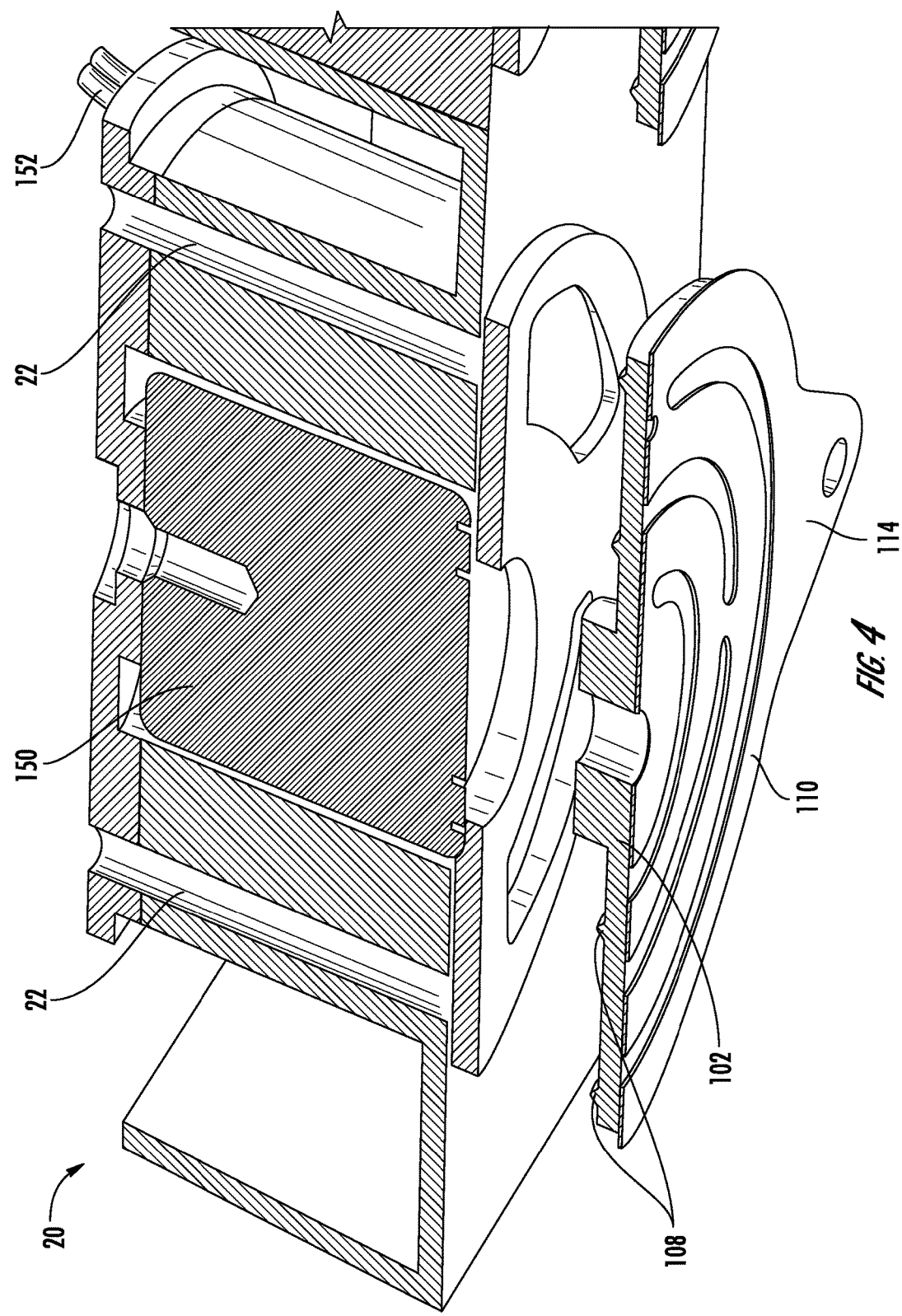
FIG. 4 is a perspective view of an air exchange panel.
Figure 5:
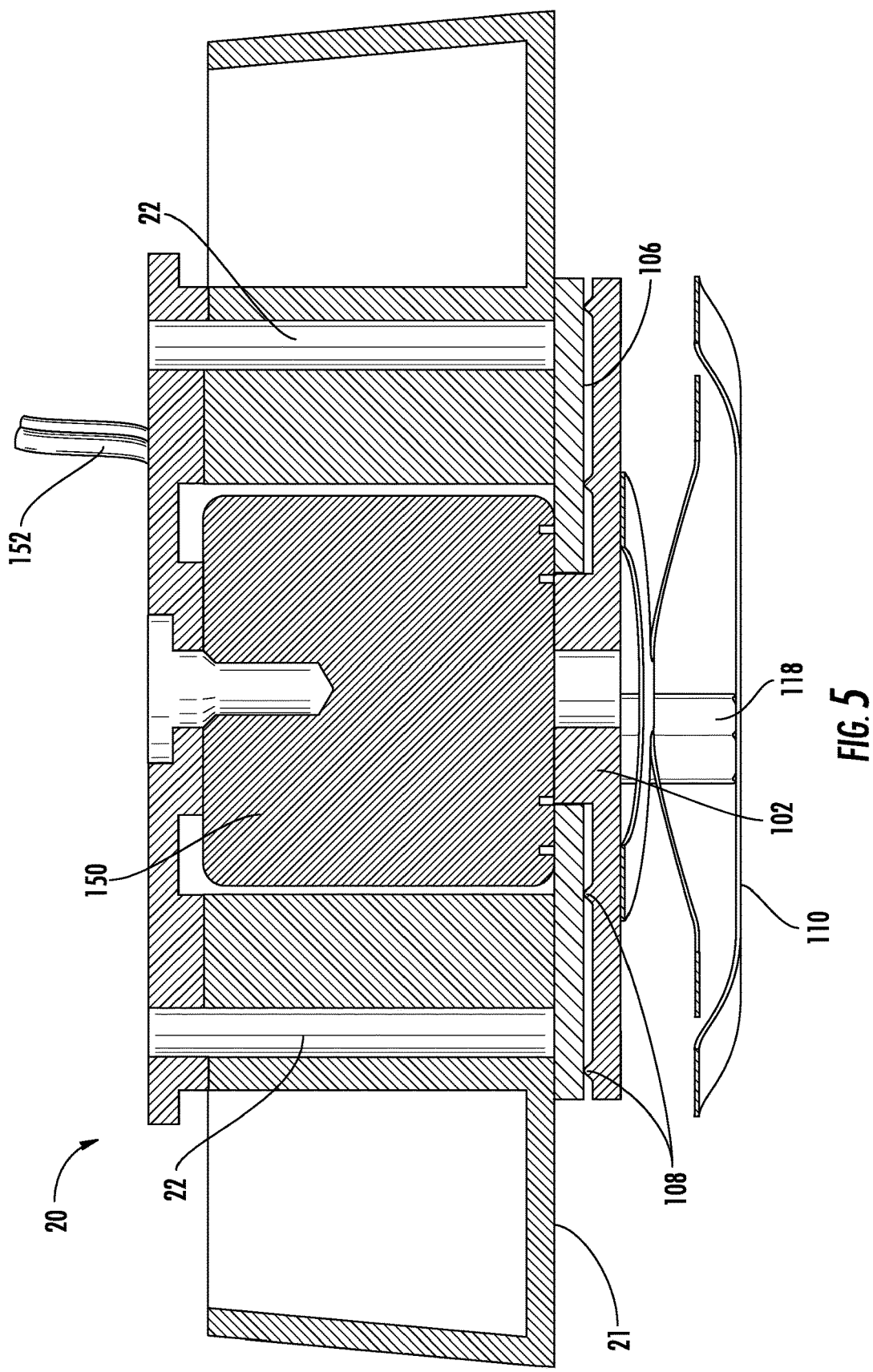
FIG. 5 is a perspective view of an air exchange panel.

FIGS. 4 and 5 are cross-sectional views of the air exchange panel 20 when the air exchange valve 100 is in an open position and a closed position. Housed within the air exchange panel 20, is an electromagnet 150. In one embodiment, the electromagnet 150 includes an iron core and a wire 152 wrapped around the iron core. The wire 152 of the electromagnet 150 is coupled to the controller 28 so that power may be selectively applied to the wire 152. At least one air intake duct 22 is disposed adjacent the electromagnet 150. The air intake duct 22 extends through the air exchange panel 20 and into the container 12. The air exchange valve 100 is mounted to an exterior surface 21 of the air exchange panel 20 using a plurality of fasteners, such as screws for example. A fastener may extend through the hole 116, 122 in the flanges 114, 120 of the resilient flexible member 110 and the adjacent spacer 118, 124 respectively into the air exchange panel 20. The spacers 118, 124 define a space between the plane of the resilient flexible member 110 and the air exchange panel 20 so that the valve cap 102 may move between an open position and a closed position.

During operation of the transport refrigeration system 10, the air exchange valve 100 is biased into the open position by the resilient flexible member 110, as shown in FIG. 4. When the valve cap 102 is open, air may flow through the air intake ducts 22 of the air exchange panel 20. The pressure differential between the atmosphere and the inside of the container 12 draws the air through the open air intake ducts 22 and into the container 12.

If the sensor 26 detects that the oxygen level inside the container 12 has reached an acceptable level, the sensor 26 generates and sends a signal to the controller 28 coupled to the electromagnet 150. The controller 28 closes the valve 100 by applying power to the wire 152. When power is applied, the electromagnet 150 generates a magnetic field that attracts the valve cap 102, such that the sealing mechanisms 108 of the valve cap 102 create a seal about the air intake duct 22. The valve 100 will remain closed as long as the controller continues to power the electromagnet 150. When the sensor 26 determines that the oxygen level in the container 12 is too low, the sensor 26 generates and sends another signal to the controller 28. The controller 28, in turn, stops supplying electricity to the wire 152 of the electromagnet 150, thereby eliminating the magnetic field that attracts the valve cap 102. Because the electromagnet 150 no longer attracts the valve cap 102, the resilient flexible member 110 is able to bias the valve cap 102 into the open position. The sealing mechanisms 108 again separate from the surface 21 of the air exchange panel 20 to allow air to flow through the air intake ducts 22 and into the container 12.

Figure 6:
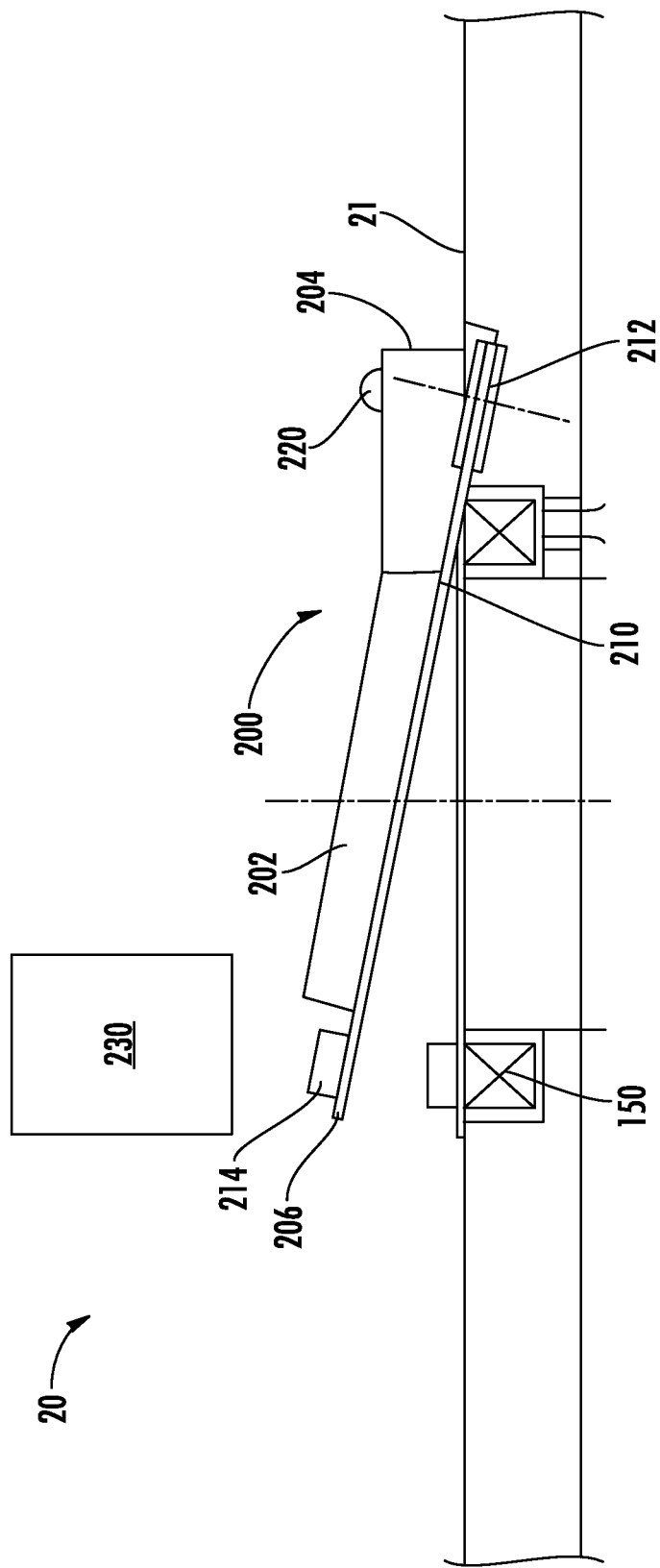
FIG. 6 is a cross-section of another air exchange valve.

In an alternate embodiment, illustrated in FIG. 6, the air exchange valve 200 pivots relative to the surface 21 the air exchange panel 20, rather than moving parallel to the air exchange panel 20 as described above. A first end 204 of the valve cap 202 may be mounted to the air exchange panel 20 with a resilient flexible member 210 and at least one fastener 220. Fixed to the first end 204, adjacent the fastener 220, is a stiffener plate 212 that securely clamps the valve cap 202 in a closed position. Mounted near the free end 206 of the valve cap 202 is a magnetic material 214, such as an iron core or permanent magnet for example. The magnetic material 214 is located opposite the electromagnet 150 of the air exchange panel, such that when the electromagnet 150 generates a magnetic field, the magnetic material 214 is attracted to the electromagnet 150. During normal operation, the valve cap 202 is biased into an open position by the flexible resilient member 210. When power is applied to the electromagnet 150, the magnetic material 214 is attracted to the magnetic field of the electromagnet 150 and the valve cap 202 is held in a closed position. When power is removed from the electromagnet 150, the magnetic force attracting the permanent magnet 214 is eliminated, and the resilient flexible member 210 biases the valve cap 202 to an open position. A stop 230 may be disposed adjacent the free end 206 of the valve cap 202 to limit the angular movement of the valve cap 202 relative to the air exchange panel 20. Though it is desirable to provide a valve 202 that is open in the event of a power failure, it is within the scope of the invention to apply power to the electromagnet 150 to open the valve 200 rather than to close it.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electro-magnetic valve for use in an air exchange panel of a transportation refrigeration system, comprising:
    a valve cap configured and arranged to be positioned adjacent the air exchange panel and movable between a first position and a second position, the valve cap including a magnetic portion;
    a resilient flexible member coupled to the valve cap and configured and arranged to be coupled to the air exchange panel to bias the valve cap into the first position;
    an electromagnet positioned inside the air exchange panel opposite the valve cap, and
    a controller that selectively applies power to the electromagnet to move the valve cap between the first position and the second position;
    wherein the first position is an opened position allowing an airflow across the valve and the second position is a closed position stopping the airflow across the valve;
    wherein a first end of the valve cap is fixed at the air exchange panel, and the second end of the valve cap is a free end, and configured such that the valve cap pivots about the first end between the first position and the second position;
    wherein the resilient flexible member is planar when the valve cap is in the first position;
    wherein the magnetic portion is positioned at the free end, and the electromagnet is located proximate to the free end such that when activated the electromagnet is interactive with the magnetic portion.

2. The electro-magnetic check valve according to claim 1, wherein the valve cap is made of an iron based steel.

3. The electro-magnetic check valve according to claim 1, wherein the valve cap includes a permanent magnet.

4. The electro-magnetic check valve according to claim 1, wherein the resilient flexible member extends from a plane in the direction of the electromagnet when the valve cap is in the second position.

5. A transportation refrigeration system comprising:
    a container having a wall;
    a sensor for detecting a state within the container;
    an air exchange panel disposed within the wall of the container including an air intake duct;
    an air exchange valve mounted to the air exchange panel adjacent the air intake duct including:
        a valve cap movable between a first position and a second position;
        a resilient flexible member coupled to the valve cap to bias the valve cap into a first position;
    an electromagnet disposed within the air exchange panel opposite the valve cap; and
    a controller for selectively applying power to the electromagnet to move the valve cap between a first position and a second position in response to a signal from the sensor;
    wherein the first position is an opened position allowing an airflow across the valve and the second position is a closed position stopping the airflow across the valve;
    wherein a first end of the valve cap is fixed at the air exchange panel, and the second end of the valve cap is a free end, and configured such that the valve cap pivots about the first end between the first position and the second position;
    wherein the resilient flexible member is planar when the valve cap is in the first position;
    wherein the magnetic portion is positioned at the free end, and the electromagnet is located proximate to the free end such that when activated the electromagnet is interactive with the magnetic portion.

6. The transportation refrigeration system according to claim 5, wherein the valve cap is made of an iron based steel.

7. The transportation refrigeration system according to claim 5, wherein the valve cap includes a permanent magnet.

8. The transportation refrigeration system according to claim 5, wherein the resilient flexible member extends from a plane in the direction of the electromagnet when the valve cap is in the second position.

9. The transportation refrigeration system according to claim 5, wherein the sensor detects an amount of oxygen within the container.

10. The transportation refrigeration system according to claim 5, wherein the sensor detects an amount of carbon dioxide within the container.

11. A method for operating a transportation refrigeration system having a container configured to store cargo, comprising:
    detecting an oxygen level within the container;
    applying power to an electromagnet if the oxygen level is greater than or equal to a threshold, thus moving a valve cap of a valve from an opened position allowing an airflow across the valve to a closed position stopping the airflow across the valve;
    detecting the oxygen level within the container;
    removing power from the electromagnet if the oxygen level is below the threshold; and
    biasing the valve cap to the opened position with a resilient flexible member;
    wherein a first end of the valve cap is fixed at the air exchange panel, and the second end of the valve cap is a free end, and configured such that the valve cap pivots about the first end between the opened position and the closed position;
    wherein the resilient flexible member is planar when the valve cap is in the first position;
    wherein the magnetic portion is positioned at the free end, and the electromagnet is located proximate to the free end such that when activated the electromagnet is interactive with the magnetic portion.

12. The method according to claim 11, wherein the oxygen level is detected by a sensor within the container.

13. The method according to claim 11, wherein a controller is coupled to both the sensor and the electromagnet.

14. The method according to claim 13, wherein the controller applies power to and removes power from the electromagnet in response to a signal from the sensor.

15. The method according to claim 11, wherein the resilient flexible member is coupled to the valve cap.

* * * * *